(12) United States Patent
Fricker

(10) Patent No.: US 9,143,338 B2
(45) Date of Patent: Sep. 22, 2015

(54) POSITION DISCOVERY BY DETECTING IRREGULARITIES IN A NETWORK TOPOLOGY

(71) Applicant: Jean-Philippe Fricker, Mountain View, CA (US)

(72) Inventor: Jean-Philippe Fricker, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 183 days.

(21) Appl. No.: 13/645,977

(22) Filed: Oct. 5, 2012

(65) Prior Publication Data

US 2014/0098702 A1 Apr. 10, 2014

(51) Int. Cl.

| | |
|---|---|
| *G06F 13/00* | (2006.01) |
| *H04L 12/28* | (2006.01) |
| *G06F 9/44* | (2006.01) |
| *H04L 12/721* | (2013.01) |
| *G06F 11/30* | (2006.01) |
| *G06F 13/14* | (2006.01) |

(52) U.S. Cl.
CPC *H04L 12/28* (2013.01); *G06F 9/44* (2013.01); *H04L 45/06* (2013.01); *G06F 11/30* (2013.01); *G06F 11/3041* (2013.01); *G06F 13/00* (2013.01); *G06F 13/14* (2013.01)

(58) Field of Classification Search
CPC ..... G06F 11/30; G06F 11/3041; G06F 13/00; G06F 13/14
USPC .................................................. 370/254, 258
See application file for complete search history.

(56) References Cited

U.S. PATENT DOCUMENTS

| | | | |
|---|---|---|---|
| 6,546,453 B1 | 4/2003 | Kessler et al. | |
| 7,315,251 B1 * | 1/2008 | Holland et al. | 340/635 |
| 7,774,642 B1 * | 8/2010 | Johnsen et al. | 714/5.11 |
| 2003/0115397 A1 * | 6/2003 | Hawkins et al. | 710/305 |
| 2004/0103179 A1 * | 5/2004 | Damm et al. | 709/223 |
| 2004/0114530 A1 * | 6/2004 | Cornet et al. | 370/252 |
| 2004/0213261 A1 * | 10/2004 | Willhite et al. | 370/395.4 |
| 2008/0080384 A1 * | 4/2008 | Atkins et al. | 370/252 |
| 2008/0155368 A1 * | 6/2008 | Bofferding et al. | 714/746 |
| 2009/0022052 A1 * | 1/2009 | Yoshimaru | 370/223 |
| 2011/0154115 A1 * | 6/2011 | Calkin et al. | 714/37 |

(Continued)

OTHER PUBLICATIONS

Carter et al., "Impulse: Memory System Support for Scientific Applications", Department of Computer Science, University of Utah, Jan. 1999, 23 pages.

(Continued)

*Primary Examiner* — Farah Faroul

(57) ABSTRACT

Processing nodes in a 3D torus network topology are connected together via an interconnect that introduces at least one irregularity into the link connections between processing nodes of each ring of the network. Each processing node detects whether there is an irregularity in its links with adjacent processing nodes in a ring. As the sockets or other processing node interfaces of the interconnect are wired to introduce this irregularity and as the positions of the processing nodes within a given ring are relative to this irregularity, the physical location of the processing nodes can be determined based on correlations between physical locations of the sockets relative to the irregularity and the positions of the processing nodes relative to the irregularity. Thus, the relative position of a processing node in the ring can be used to identify the socket with which the processing node is coupled, thereby facilitating network management operations.

26 Claims, 7 Drawing Sheets

(56) References Cited

U.S. PATENT DOCUMENTS

2011/0228864 A1* 9/2011 Aryanfar et al. ............. 375/259
2011/0273989 A1* 11/2011 Sayers et al. ................ 370/237
2011/0292833 A1* 12/2011 Kapitany et al. ............ 370/254
2013/0205069 A1* 8/2013 Delfatti et al. .............. 711/103
2013/0311817 A1* 11/2013 Kim et al. ................... 713/501
2014/0059266 A1* 2/2014 Ben-Michael et al. ...... 710/313

OTHER PUBLICATIONS

Che et al., "Dymaxion: Optimizing Memory Access Patterns for Heterogeneous Systems", Department of Computer Science, University of Virginia, Jan. 2011, 11 pages.

Zhang et al., "The Impulse Memory Controller", IEEE Transactions on Computers, vol. 50, No. 11, Nov. 2001, 16 pages.

* cited by examiner

US 9,143,338 B2

POSITION DISCOVERY BY DETECTING IRREGULARITIES IN A NETWORK TOPOLOGY

FIELD OF THE DISCLOSURE

The present disclosure generally relates to processing systems and more particularly relates to a position discovery in a network.

BACKGROUND

High performance computing systems, such as server systems or server racks, are typically implemented using processing nodes connected together by one or more fabric interconnects. These processing nodes often are implemented as field replaceable units (FRUs), which typically constitute a card, a blade, or another pluggable form, that may be quickly swapped in and out of corresponding sockets of the interconnect, which allows the FRUs to be easily replaceable and upgradeable and facilitates adaptation and scaling of the high performance computing system.

In order to maintain a high level of flexibility, the FRUs can share a common configuration, such that an FRU can be installed into any socket at any location in the interconnect, and can operate there without having to be specially configured to operate in that socket. However, many network topologies, such as ring networks and torus networks, do not have any fixed absolute reference points and thus, because the FRUs can be installed in any socket in the interconnect, it is often difficult to identify the particular position within the network in the absence of such an absolute reference point, or to identify the particular location of the FRU in the interconnect. It may be desirable to determine an absolute reference point of an FRU within a ring in order to determine a physical location of the FRU in a system that implements a ring network or a torus network. For example, it may be desirable to provide an indication of a location for a particular FRU, such as for an FRU that has experienced a fault condition, in order to quickly identify the FRU for replacement or service, to replace a disk drive on the FRU, or to change a cabled connector to the FRU.

One conventional approach for signaling the position of an FRU within the network includes providing dedicated position identification pins in the sockets and corresponding traces in the hardwiring of the interconnect. However, this approach is unduly complex and expensive to implement as the number of FRUs increases. For example, a server of 64 processing nodes would require 6 dedicated position identification pins when using a binary encoding scheme ($2^6=64$) and a corresponding number of traces in the interconnect to encode the particular position of each socket. Another conventional approach includes providing logic and a storage element at each socket that stores a corresponding position identifier such that when an FRU is inserted into a given socket, the logic at the socket provides the corresponding position identifier to the FRU. Such logic at the socket is sometimes implemented with a centralized controller that has individual point-to-point connectivity to each socket and is able to provide a dedicated position identifier to each FRU. However, the need to implement logic and a storage element at each socket of the interconnect increases the cost and complexity of the interconnect.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
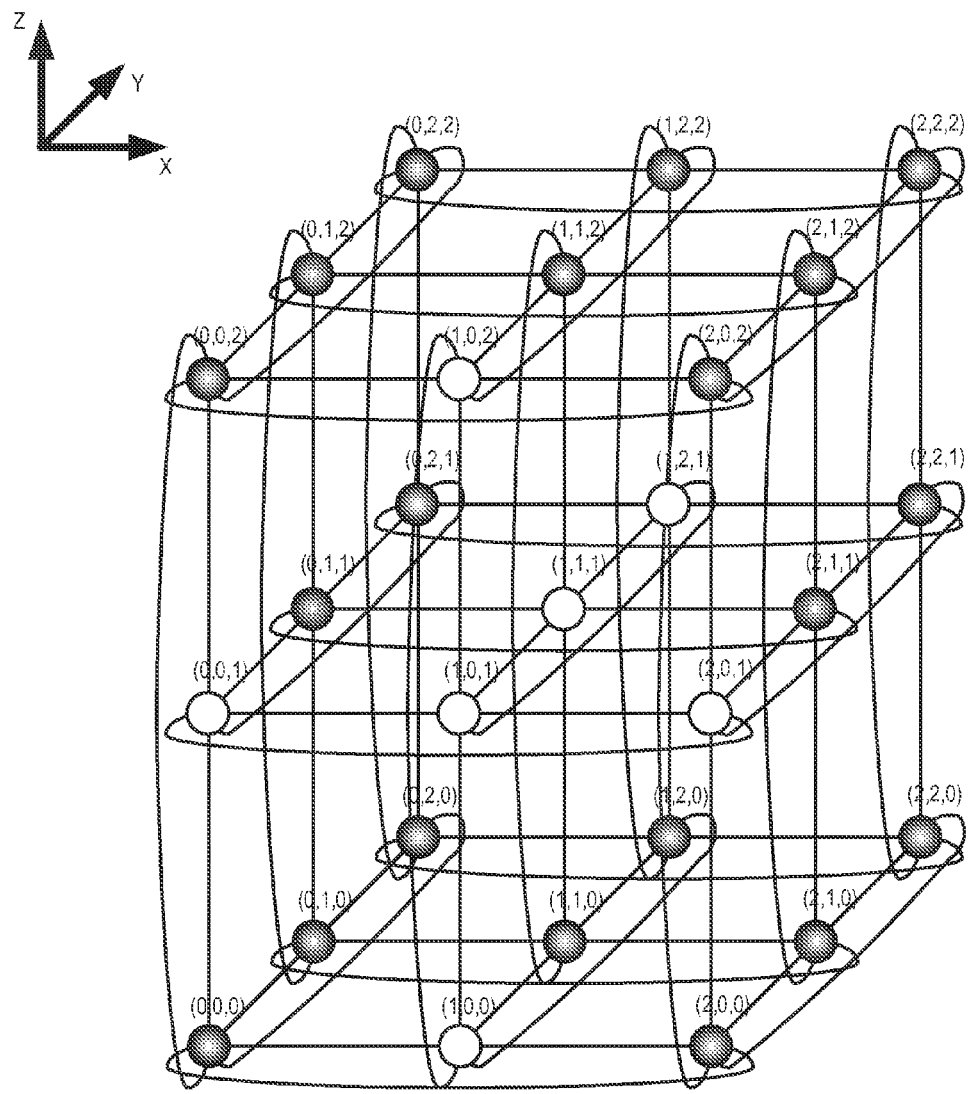
FIG. 1 is a block diagram illustrating a 3D torus network in accordance with some embodiments.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

FIGS. 1-10 illustrate various techniques for enabling a processing node to determine its relative position in a network topology absent an absolute reference point, such as in a ring network or torus network. In some embodiments, processing nodes arranged in a 3D torus network topology are connected together via an interconnect. In at least one embodiment, the interconnect does not include pins dedicated to position identification in the interconnect. As such, the interconnect instead is configured to introduce at least one "irregularity" into the data link connections between the processing nodes of each ring of the network. Each processing node is configured to detect an irregularity in the links between itself and the adjacent processing nodes in each ring. In some embodiments, the irregularity is detected in that the processing node has at least a "regular" link for the ring and an "irregular" link for the ring. That is, the irregular link is irregular relative to other links in the ring. When a processing node detects an irregularity, the processing node determines that it is in a specified position within the associated ring (e.g., at a "first position" or "first socket" within the ring). Then, the first processing node provides a message to another processing node in the ring, indicating that the processing node that detected the irregularity is the first processing node, from which the next processing node determines that it is in the second processing node or second socket position. These positional messages are cascaded through the ring until each processing node in the ring has determined its relative position within the ring based upon a message received from another processing node in the ring.

As the sockets or other processing node interfaces of the interconnect are wired to introduce this irregularity and as the positions of the processing nodes within a given ring are relative to this irregularity, the physical location of the processing nodes can be determined based on the correlation between physical locations of the sockets relative to the irregularity and the reported positions of the processing nodes relative to the irregularity. As such, the relative position of a processing node in the ring can be used to identify the socket with which the processing node is coupled, thereby facilitating network management operations with respect to the processing node, such as replacement or a swap out of a faulty processing node, upgrading the processing node, and the like. Moreover, by utilizing certain port-type identifier messages or physical wiring configurations as described below, this relative position technique can be implemented in a manner that is transparent to the transmission of data between the processing nodes via the interconnect.

For purposes of the following discussion, a link between the port of one processing node and the port of another processing node is said to be a regular link or an irregular link based on one or more link characteristics of the link, whereby regular links have one or more specified link characteristics, and irregular links having one or more different specified link characteristics. These link characteristics may pertain to the physical characteristics of the link. For example, as described in greater detail herein, the wire pairs implementing a differential-signaling link may be inverted to introduce a polarity inversion between the transmitting port and the receiving port to indicate an irregular link, such that the link characteristic defining an irregular link includes a polarity inversion of the differential-signaling link and the link characteristic defining a regular link is the absence of a polarity inversion in the link. Alternatively, the link characteristics may pertain to the logical connection afforded by the link. For example, as described in greater detail herein, each port on a processing node may be assigned a port type that is communicated by the port when is connects via a link, and the link characteristic defining a regular link may include that the link connects a port of another type, whereas the link characteristic defining an irregular link may include that the link connects a port of one type to a port of the same type (or vice versa).

In some embodiments, a computing system employs link irregularities to facilitate relative position determinations in a ring-type or torus-type network topology. The computing system can include a server system or other high-performance computing system, and includes an interconnect with plug-in sockets for connecting one or more field replaceable units (FRUs) into the interconnect. The interconnect connects the FRUs into rings and connects the rings into a 2D- or 3D-torus network topology, where each ring implements one or more irregular links through wiring of its corresponding plug-in sockets. Each FRU includes one or more processor cores connected to a fabric interface such as a southbridge or input/output controller, and one or more memory devices such as system random access memory, and a socket interface connects the FRU into the interconnect. The interconnect includes a fabric interconnect that provides data communication paths between the plug-in sockets to configure the FRUs into a 2D- or 3D-torus network topology.

For ease of illustration, techniques are described herein in the context of a three-dimensional (3D) torus network topology, which comprises a network of rings in three dimensions such that each processing node is a member of three different rings. However, these techniques are not limited to a 3D torus network topology, or a torus network topology in general, but instead may be implemented in any of a variety of network topologies, and particularly those absent an absolute reference point, such as a ring network. Moreover, while example contexts of the processing nodes as FRUs are used herein, the example techniques described herein may be applied for any of a variety of implementations of processing nodes without departing from the scope of the disclosed embodiments.

FIG. 1 illustrates a network 100 of processing nodes that are arranged in a 3D torus network topology in accordance with some embodiments. In the depicted example, network 100 comprises twenty-seven processing nodes that are configured in rings of three processing nodes each. The rings are formed in three orthogonal dimensions (X,Y,Z), and each processing node is a member of three different rings, one in each of the dimensions. Each processing node is connected to six neighboring processing nodes via bidirectional connections. The relative position of each processing node is identified in FIG. 1 by the tuple (x,y,z), where x, y, and z represent the position of the processing node in the X, Y, and Z dimensions, respectively.

Although depicted logically in FIG. 1 as a 3D array, the 3D torus network topology for network 100 typically is implemented via the wiring of an interconnect with the processing nodes in the network physically arranged in a 2-dimensional grid in the interconnect or physically arranged linearly in the interconnect. That is, the relative position of a processing node in the 3D torus network topology is provided by the processing nodes wired connections to certain other processing nodes in the 3D torus, rather than the physical location of the processing node. In some embodiments, the interconnect comprises a plurality of sockets wired together via a fabric interconnect so as to implement the 3D torus network topology, and each of the processing nodes comprises an FRU configured to couple to the sockets used by the interconnect, such that the position of the processing node in the 3D torus network topology is dictated by the socket into which the processing node is inserted. An interconnect can include a fixed or flexible interconnect such as a backplane, a printed wiring board, a motherboard, cabling or other flexible wiring, or a combination thereof. Moreover, an interconnect can include electrical signaling, a photonic signaling, or a combination thereof.

In some embodiments, the bidirectional links between processing nodes include one or more high-speed point-to-point serial communication links which utilize, for example, differential pair signaling between the connected processing nodes. For example, a bidirectional connection between processing nodes can include one or more Peripheral Component Interconnect Express (PCIe) links or external PCIe links, such as a x1 PCIe link, a x4 PCIe link, a x8 PCIe link, or a x16 PCIe link, or a 10 Gigabit Ethernet (GbE) Attachment Unit Interface (XAUI) interface.

In contrast to a ring network or 3D torus network that utilizes one or more of the conventional approaches described above for determining a fixed absolute reference position for each processing node, the interconnect of network 100 is configured to introduce at least one irregularity into the links, or irregular link, between the processing nodes of each ring of the network, whereby the irregular link serves as a reference point for determining positions in the ring. To this end, each processing node is configured to determine whether it has a port connected to a link with an irregularity. If a port connected to an irregular link is detected, the processing node can determine that it is at a first position within the associated ring. Then, the processing node at the first position provides a message to the other processing nodes in the ring, indicating that the processing node that detected the irregularity is the first processing node. The other processing nodes in the ring then can determine their relative positions within the ring based upon the message. A network management module (not shown) then can determine the physical location of the socket to which each processing node is coupled based on the determined relative position of the processing node within the ring.

Moreover, because a 3D torus network employs multiple parallel rings, the processing nodes in a ring experiencing a discontinuity or "break" (resulting from a non-operational or missing processing node) would remain capable of discovering their relative locations in the ring based on their relationships with processing nodes in parallel rings. To illustrate, assuming a ring of processing nodes on the X-axis has break, the processing nodes in this ring can communicate with their counterpart processing nodes on the Y-axis to determine the counterpart processing nodes positions relative to their ring on the X-axis and thus infer their absolute positions. For example, assume the ring formed on the X-axis by processing nodes (0,0,0), (1,0,0), and (2,0,0) is broken. In this example, there is a parallel ring formed on the X-axis by processing nodes (0,0,1), (1,0,1), and (2,0,1). Accordingly, the processing node (0,0,0) can communicate with the processing node (0,0,1) to determine the position of processing node (0,0,1) in its corresponding X-axis ring and thus infer the position of the processing node (0,0,0) in its corresponding X-axis ring. Likewise, the processing nodes (1,0,0) and (2,0,0) can communicate with processing nodes (1,0,1) and (2,0,1), respectively, to determine their positions based on the positions of processing nodes (1,0,1) and (2,0,1) in their corresponding X-axis ring.

Figure 2:
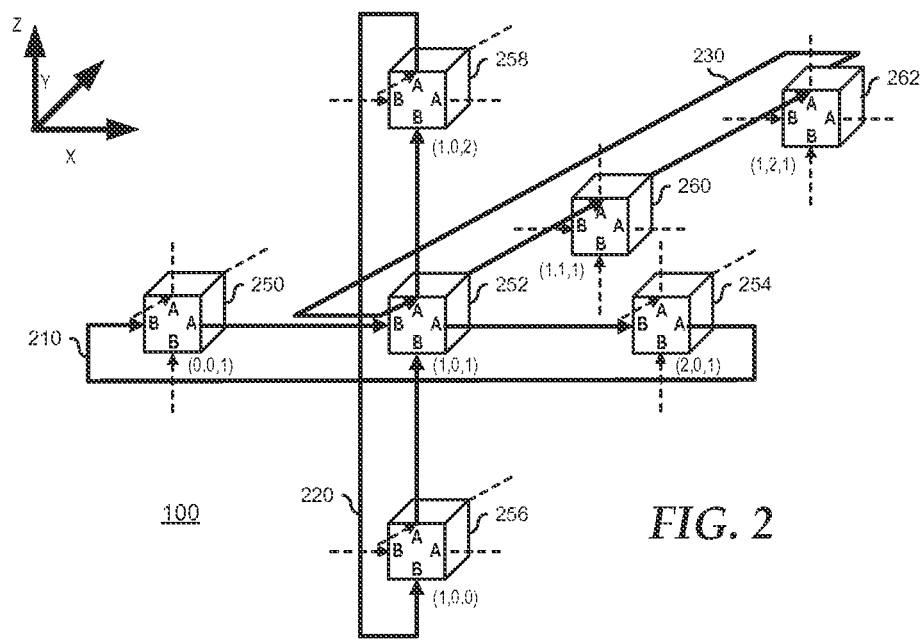
FIG. 2 is a block diagram illustrating three rings in the 3D torus network of FIG. 1 having a processing node in common in accordance with some embodiments.

FIG. 2 illustrates an example portion of network 100 relative to position (1,0,1) in the 3D torus network topology. In the depicted example, the portion includes ring 210 in the X dimension, ring 220 in the Y dimension, and ring 230 in the Z dimension. Ring 210 includes processing node 250 at position (0,0,1), processing node 252 at position (1,0,1), and processing node 254 at position (2,0,1). Ring 220 includes processing node 252, processing node 260 at position (1,1,1), and processing node 262 at position (1,2,1). Ring 230 includes processing node 256 at position (1,0,0), processing node 252, and processing node 258 at position (1,0,2). Note that processing node 252 is included in each of rings 210, 220, and 230. As shall be described below, each of rings 210, 220, and 230 has one of the included processing nodes that is designated as the first processing node in the corresponding ring. The designation of a processing node as the first processing node in a ring thereby permits the other processing nodes of the ring to identify their positions relative to the position of the first processing node. For example, processing node 250 can be designated as the first processing node in ring 210, processing node 252 can be designated as the first processing node in ring 220, and processing node 256 can be designated as the first processing node in ring 230. Further note that that any particular processing node can be the first processing node in one, two, or three of its rings, or can be the first processing node in none of the three rings, depending on the position of the processing node relative to the irregularities introduced into the links connecting the processing nodes of the corresponding rings.

Each processing node 250 through 262 is shown as including one or more ports of one type, denoted herein as an "A-type" port, in each of the X, Y, and Z dimensions, and one or more ports of another type, denoted herein as a "B-type" port in each of the dimensions. Within each ring, a port of each processing node 250 through 262 is connected to a port of the neighboring processing node. Note that, although each bidirectional link between processing nodes 250 through 262 is illustrated as having a direction, as indicated by the arrows between the processing nodes, it is to be understood that the directionality is to provide a convention for notation, and is not intended to indicate a direction of data communications. Note further that the designation of the ports as an "A-type" or a "B-type" are also to be understood as establishing a convention for notation, and that other conventions such as a numbering scheme (e.g., 1, 2), a symbol scheme (e.g., "+" and "−") can be used, as needed or desired.

A port "type" may take any of a variety of forms depending on the implementation. In some embodiments, described below with respect to FIG. 3, an A-type port is the port connected to a first subset of electrical contacts (e.g., pins 0 and 1) of a socket interface, whereas a B-type port is the port connected to a different second subset of the electrical contacts (e.g., pins 2 and 3) of the socket interface. That is, in this example, A-type=pins 0 and 1, B-type=pins 2 and 3. Thus, a link wired to connect an A-type port of one processing node to an A-type port of another processing node is wired such that pins 0 and 1 of the socket interface of one processing node are connected to pins 0 and 1 of the socket interface of the other processing node. In this case, the link may be said to have the link characteristic of connecting A-type ports together. Conversely, in this example a link wired to connect an A-type port of one processing node to a B-type port of another processing node is wired such that pins 0 and 1 of the socket interface of the one processing node are connected to pins 2 and 3 of the socket interface of the other processing node. In this instance, this link may be said to have the link characteristic of connecting ports of different types together (e.g., A-to-B or B-to-A).

As described in greater detail herein, the link characteristic of a link may be determined from a physical manifestation of the link itself or the ports connected to the link, from a logical manifestation of the port-types on the ends of the link, or a combination thereof. A physical manifestation of the link characteristics can include, for example, the manner in which the link is wired with respect to the pins of the socket interface (e.g., connecting pins 0 and 1 of one socket interface to either pins 0 and 1 or pins 2 and 3 of the other socket interface) or through the particular PCIe link assignments or lane assignments, through wiring that causes a polarity inversion between the transmit side and receive side of a differential-signaling implementation of a link, and the like. Examples of a logical manifestation of a link characteristic can include, for example, determining the port types of the ports at the ends of the link based on port-type indicators signaled by the ports of the link during, for example, an auto-negotiation process or training process. Thus, a port at one processing node receiving a port-type indicator indicating that the port at the other end of the link is an A-type port can determine that the link has one link characteristic, whereas the port receiving a port-type indicator indicating the port at the other end of the link is a B-type port can determine that the link has a different characteristic. As described in greater detail herein, the link characteristics of the links connected to the ports of a processing node can be used to determine whether the processing node is connected to one or more irregular links, and thus determine a relative position of the processing node relative to the "fold"

in the ring represented by the irregular link. This relative position in the ring can then be used to determine the location of the socket interface in the interconnect, and thus indicating the physical location of the processing node.

Figure 3:
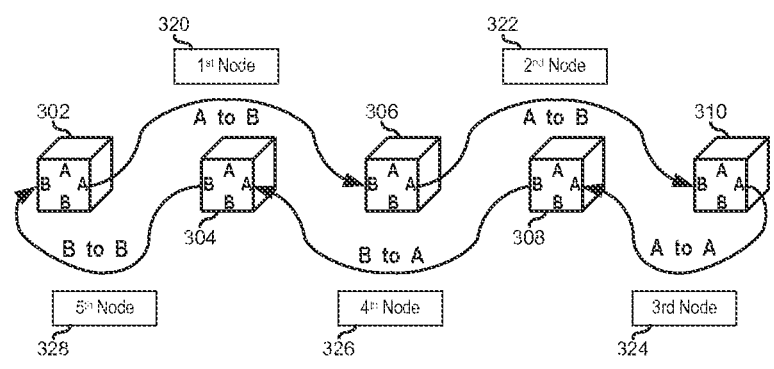
FIG. 3 is a block diagram illustrating one of the three rings of FIG. 2 in accordance with some embodiments.

FIG. 3 illustrates a ring 300 including processing nodes 302, 304, 306, 308, and 310. The ring 300 can represent, for example, any of rings 210, 220, or 230 of FIG. 2 and processing nodes 302 through 310 can represent, for example, any of the processing nodes 250 through 262 in a given ring. For simplicity of illustration, only the connections of processing nodes 302 through 310 in the X dimension are shown, but it should be understood that the embodiments as described herein is also applicable to rings in other dimensions of a torus network. The illustrated left-to-right positions of the processing nodes 302 through 310 depict the relative left-to-right-physical positions of the processing nodes 302 through 310 in an interconnect. However, to eliminate a long physical connection between processing node 302 at the left end and processing node 310 at the right end, ring 300 is configured in a folded torus topology, such that the A-type port of processing node 302 is connected to the B-type port of processing node 306, the A-type port of processing node 306 is connected to the B-type port of processing node 310, the A-type port of processing node 310 is connected to the A-type port of processing node 308, the B-type port of processing node 308 is connected to the A-type port of processing node 304, and the B-type port of processing node 304 is connected to the B-type port of processing node 302. Thus, the connections between processing nodes 302 through 310 do not physically span more than one intervening processing node position. As such, the folded torus network topology can improve performance of the ring 300 by eliminating a long loopback connection between the ends of the ring.

In some embodiments, the interconnect (not shown) connecting the processing nodes 302 through 310 is configured for a given ring so that most of the links in the ring have a certain link characteristic (i.e., are regular links) and one link or a small number of other links in the ring have a different link characteristic (i.e., is an irregular link). For example, the links between processing nodes 302 and 306, between processing nodes 306 and 310, and between processing nodes 308 and 304 are all characterized by the fact that an A-type port is connected to a B-type port. However, the interconnect includes two irregularities in the A-to-B port-to-port connection characteristic in that the interconnect is wired to link processing nodes 302 and 304 such that a B-type port is connected to a B-type port (that is, a B-to-B link), and to connect processing nodes 308 and 310 is such that an A-type port is connected to an A-type port (that is, an A-to-A link). The skilled artisan will recognize that, under this approach, the number of A-to-B links will increase as the number of processing nodes implemented in a ring increases, but there will be only one B-to-B link and only one A-to-A link regardless of the number of processing nodes in the ring. As such, one or both of these interconnect-wired irregularities can serve as a reference point from which the relative position of the processing nodes of a ring may be identified.

In some embodiments, by detecting an irregularity, a processing node at one side of a particular irregularity is identified as the first processing node in the ring. For example, processing nodes 302 and 304 are each associated with a B-to-B irregular link, and processing nodes 308 and 310 are each associated with an A-to-A irregular link, and any one of these processing nodes can be identified as the first processing node in ring 300. Further, in this example, one of the irregularities is determined to be associated with the first processing node in ring 300. For example, processing nodes 302 through 310 can be configured such that the detection of a B-to-B irregularity is associated with being the first processing node, while the detection of an A-to-A irregularity is ignored. Thus, in this example, only processing nodes 302 and 304 detect that they are connected to each other with a B-to-B link, and therefore one of these processing nodes will identify itself as the "first" processing node of ring 300, whereby the "first" references the processing node's logical proximity to the selected irregularity. In the example described below, processing node 302 identifies itself as the "first processing node" in ring 300 responsive to determining that it is at one end of the B-to-B port-type irregularity in ring 300.

In some embodiments, to find which one of processing nodes 302 and 304 is the first processing node, the processing nodes that have ports connected to an irregular link (e.g., processing nodes 302, 304, 308, and 310) are tagged, and processing node 306 remains untagged (because it does not detect an irregular link connected to any of its ports). Then processing nodes 302-310 count the number of intermediate processing nodes between processing nodes seeing an irregularity. The "first" processing node is determined as the processing node (here processing node 302) which has the most intermediate processing nodes on its A-type port.

When processing node 302 is identified as being the first processing node in ring 300, the relative positions of processing nodes 304 through 310 in ring 300 can be determined relative to the processing node 302 as the first processing node. For example, processing node 302 can issue a message 320 out of its A-type port, the message 320 indicating that processing node 302 is the first processing node in ring 300. Message 320 is received at the B-type port of processing node 306. From this, the processing node 306 can determine that it is the second processing node in the ring 300 based upon message 320. In response to determining it is the second processing node in ring 300, processing node 306 can issue a message 322 out of its A-type port, the message 322 indicating that the processing node 306 is the second processing node in ring 300. In response to receiving message 322 at its B-type port, processing node 310 determines that it is the third processing node in the ring based upon message 322, and thus issues a message 324 at its A-type port, the message 324 indicating that processing node 310 is the third processing node in ring 300. This cascade of messages identifying the issuing processing node's relative position to the irregular link can thus continue for the remaining processing nodes of the ring (e.g., messages 326 and 328 issued by processing nodes 308 and 304, respectively), until the first processing node, that is processing node 302 in this example, receives a corresponding message from the last processing node, that is, processing node 304, in the ring 300. Under this approach, the processing node that identifies itself as proximate to an irregular link initiates a cascade of messages that serves to incrementally signal each receiving processing node's logical position in ring 300 relative to the reference point that is the processing point proximate to the port-connection irregularity.

Figure 4:
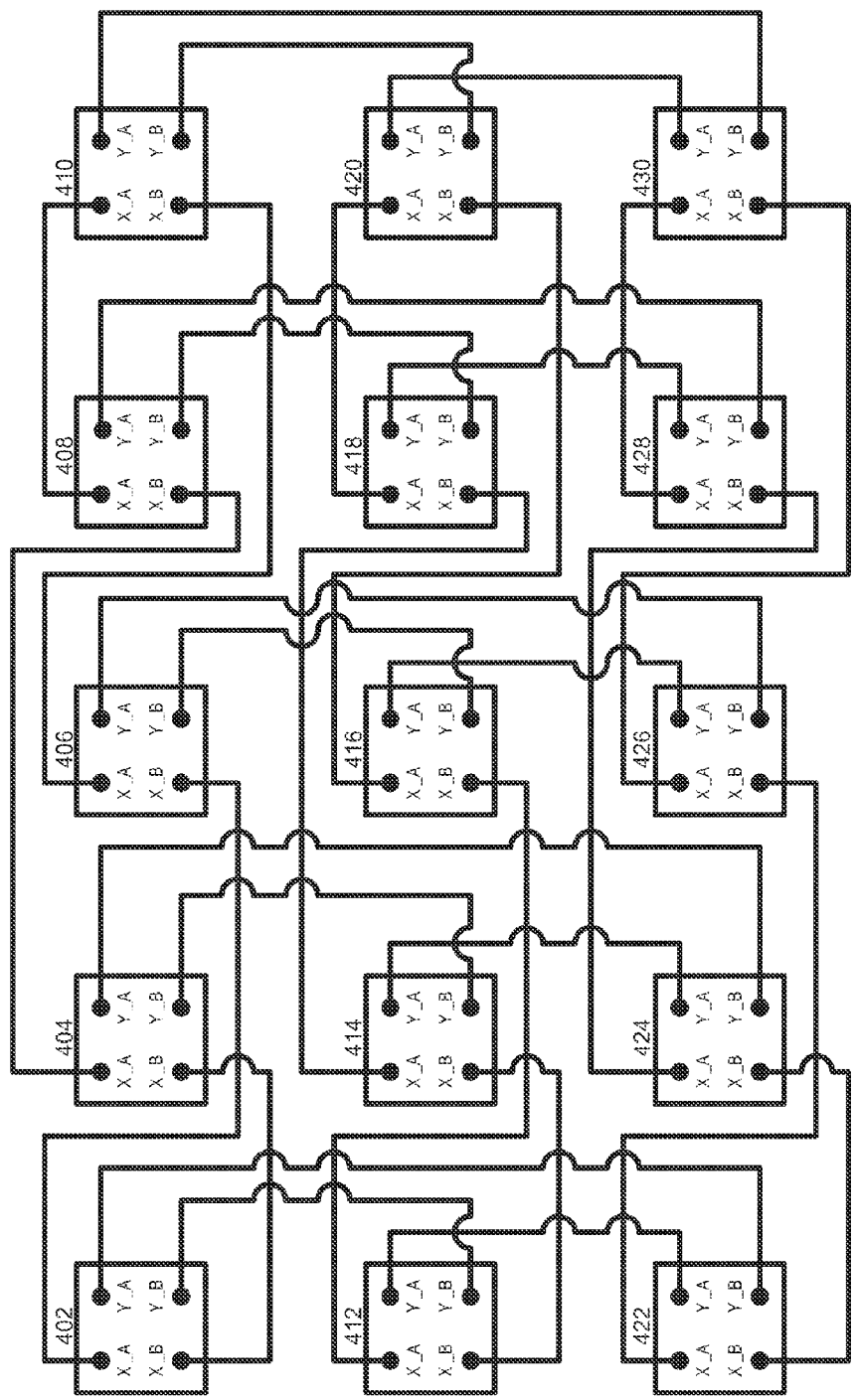
FIG. 4 is a block diagram of a fabric interface of an interconnect of the computing system of FIG. 3 in accordance with some embodiments.

FIG. 4 illustrates an interconnect 400 of a computing system. Interconnect 400 includes plug-in sockets 402 through 430 that are operable to connect one or more FRUs into the interconnect. Interconnect 400 operates to connect FRUs into three folded rings in the X-dimension and into five folded rings in the Y-dimension, and to connect the rings in a 2D-torus network topology. As such, each ring includes two irregular links, one where an A-type port of a first processing node is connected to an A-type port of another processing node (and thus having the link characteristic of linking ports of the same type A), and another where a B-type port of a first processing node is connected to a B-type port of another processing node (and thus having the link characteristic of linking ports of the same type B). As such, two irregular links are hard wired into interconnect 400 for each ring. For example, the A-type port of plug-in socket 408 for ring X (identified as "X_A") is connected to the A-type port of plug-in socket 410 for ring X (identified as "X_B"), and the B-type port of plug-in socket 408 for ring Y (identified as "Y_B") is connected to the B-type port of plug-in socket 418 for ring Y. Thus processing nodes that are installed in interconnect 400 can determine their position in the 2D-torus network topology as described above. In some embodiments, an interconnect similar to interconnect 400 includes a fabric interface that operates to provide one or more PCIe lanes or PCIe links between the processing nodes. Here, as described above, the fabric interface is configured to provide an irregular link between two processing nodes in each ring, such as by connecting a first lane in a first processing node to a second lane in a second processing node. It will be understood that the fabric interconnect as illustrated in interconnect 400 is simplified, and that each interconnection can represent one or more connections between processing nodes.

Figure 5:
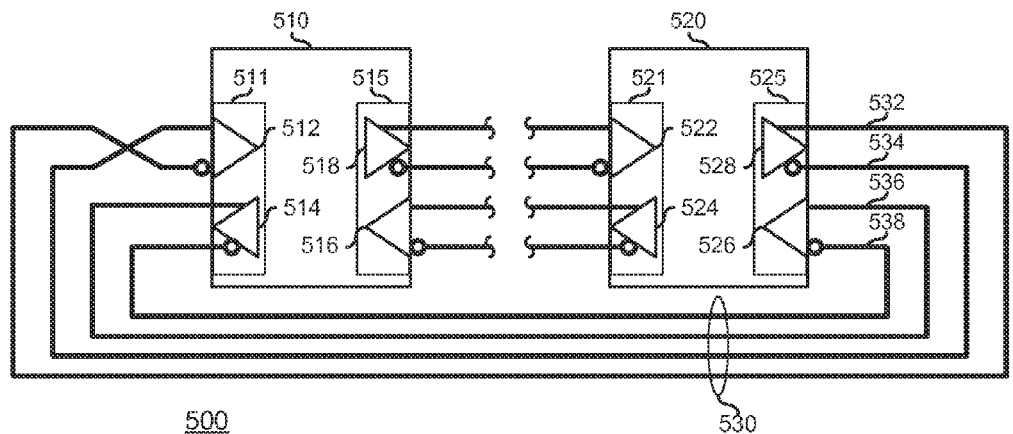
FIG. 5 is a block diagram illustrating an example port wiring of processing nodes of a ring in accordance with some embodiments.

FIG. 5 illustrates an example approach to implementing a single lane-based irregular link in the wiring of an interconnect connecting processing nodes in a folded torus ring in accordance with some embodiments. In the depicted example, ring 500 includes processing nodes 510 and 520, and one or more additional processing nodes (not shown) logically connected between processing nodes 510 and 520. Ring 500 can illustrate, for example, an implementation of ring 300 of FIG. 3 and thus processing nodes 510 and 520 are similar to processing nodes 302 through 310. Processing node 510 includes a first lane 511 and a second lane 515, and processing node 520 includes a first lane 521 and a second lane 525. Lane 511 includes a differential pair signal receiver 512 and a differential pair signal transmitter 514. Similarly, lanes 515, 521, and 525 each include a respective differential pair signal receiver 516, 522, and 526, and a respective differential pair signal transmitter 518, 524, and 528. Each differential pair signal receiver 512, 516, 522, and 526 includes a signal input and an inverted signal input, and each differential pair signal transmitter 514, 518, 524, and 528 includes a signal output and an inverted signal output. Lanes 515 and 521 are each connected to a corresponding lane of adjacent processing node in ring 500. Lanes 511 and 525 are connected to each other via a lane trace 530. Lane trace 530 includes traces 532, 534, 536, and 538. Traces 532 through 538 represent the physical interconnections between the processing nodes, and can include traces on a motherboard or interconnect, or cabling between processing nodes 510 and 520. Lanes 511, 515, 521, and 525 can represent a x1 PCIe lane. Processing nodes 510 and 520 represent end processing nodes in ring 500.

Lanes 515 and 521 each is connected in a continuous manner. As such lanes 515 and 521 are connected to their respective next processing nodes (not illustrated) such that the signal outputs of each signal transmitter (e.g., transmitters 518 and 524) is connected to the corresponding signal input of the corresponding signal receiver (e.g., receivers 516 and 522), and such that an inverted signal output of each signal transmitter is connected to the corresponding inverted signal input of the corresponding signal receiver. Lanes 511 and 525 are connected to each other such that lane trace 530 inverts the polarity of the differential signal represented by lanes 511 and 525 between the signal transmitter 528 and the receiver 512. As such, signal transmitter 528 and signal receiver 512 are connected with the signal output of signal transmitter 528 connected to the inverted signal input of signal receiver 512 via trace 532, and with the inverted signal output of signal transmitter 528 connected to the signal input of signal receiver 512 via trace 534. As such, the link represented by traces 536 and 538 has the link characteristic of having a non-inverted polarity (i.e., is a regular link in this example), whereas the link represented by traces 532 and 534 has the link characteristic of having an inverted polarity (i.e., is an irregular link in this example).

The processing node 510 detects that receiver 512 is connected with irregular link, and processing node 510 thereby determines that it is the first processing node in ring 500. In some embodiments, processing node 510 detects the irregularity when signal receiver 512 receives a lane set-up packet, and detects a sense of the signals received. For example, in the set-up process between signal transmitter 528 and signal receiver 512, the signal transmitter can send a known bit pattern (e.g., Ob0010) where a positive voltage on the signal output and a negative voltage on the inverted signal output is interpreted as a logic "0", and where a negative voltage on the signal output and a positive voltage on the inverted signal output is interpreted as a logic "1." Using the same signal convention, signal receiver 512 does not receive the same bit pattern, but instead receives the inverted bit pattern (e.g., Ob1101) because of the polarity inversion. Thus, by detecting the inverted bit pattern, processing node 510 detects the polarity-based irregularity and determines itself as the first processing node in ring 500. The skilled artisan will recognize that irregularities can be created between other combinations of signal transmitters and signal receivers as needed or desired.

Figure 6:
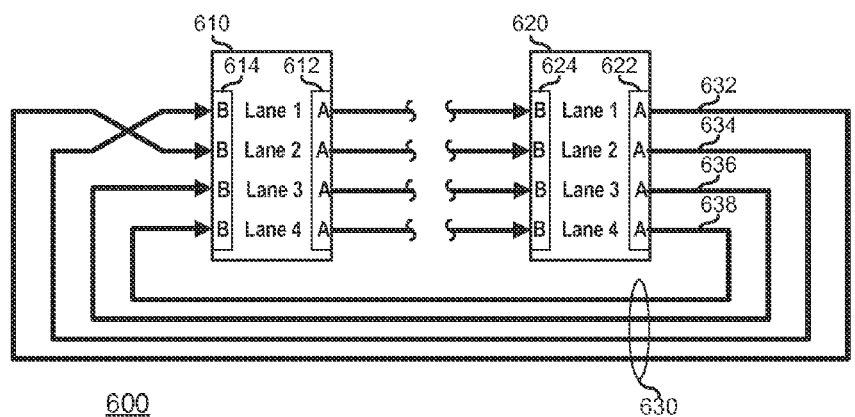
FIG. 6 is a block diagram illustrating another example port wiring of processing nodes of a ring in accordance with some embodiments.

FIG. 6 illustrates an example approach to implementing a multiple lane-based irregular link in the wiring of an interconnect connecting processing nodes in a folded torus ring in accordance with some embodiments. In the depicted example, ring 600 includes processing nodes 610 and 620, and one or more additional processing nodes (not shown) logically connected between processing nodes 610 and 620. Ring 600 can illustrate, for example, an implementation of ring 300 of FIG. 3 and thus processing nodes 610 and 620 are similar to processing nodes 302 through 310. Processing node 610 includes a first link 612, designated as an A-type link, and a second link 614, designated as a B-type link. Similarly, processing node 620 includes a first link 622, designated as an A-type link, and a second link 624, designated as a B-type link. Each link 612, 614, 622, and 624 includes four bidirectional point-to-point lanes, labeled lanes 1 through 4 that are connected to a neighbor processing node. For example, links 612, 614, 622 and 624 can represent x4 PCIe links that each includes four bidirectional PCIe lanes. Processing nodes 610 and 620 represent end processing nodes in ring 600. As such, processing nodes 610 and 620 are connected via a link trace 630. Link trace 630 includes lanes traces 632, 634, 636, and 638. Lane traces 632 through 638 represent the physical interconnections between the processing nodes, and can include traces on a motherboard or interconnect, or cabling between processing nodes 610 and 620.

Link 612 is connected in a continuous manner to a next processing node (not illustrated) such that lane 1 of link 612 is connected to a lane 1 of a B-type link in the next processing node, lane 2 is connected to a lane 2 in the next processing node, lane 3 is connected to a lane 3 of the next processing node, and lane 4 is connected to a lane 4 of the next processing node. Similarly, link 624 is connected in a continuous manner to a previous processing node (not illustrated) such that lane 1 of link 624 is connected to a lane 1 of an A-type link in the previous processing node, lane 2 is connected to a lane 2 in the previous processing node, lane 3 is connected to a lane 3 of the previous processing node, and lane 4 is connected to a lane 4 of the previous processing node.

However, processing nodes 610 and 620 are connected via an irregular link. As such, link trace 630 operates to connect lane 1 of link 622 via lane trace 632 to lane 2 of link 614, to connect lane 2 of link 622 via lane trace 634 to lane 1 of link 614, to connect lane 3 of link 622 via lane trace 636 to lane 3 of link 614, and to connect lane 4 of link 622 via lane trace 638 to lane 4 of link 614. Here, processing node 610 detects that lane 1 of link 614 is connected not to lane 1 of link 622, but rather to lane 2 to of link 622 via lane trace 634. Similarly, processing node 610 detects that lane 2 of link 614 is connected not to lane 2 of link 622, but rather to lane 1 of link 622 via lane trace 632. Thus, by detecting the irregularity via link trace 630, processing node 610 determines that it is the first processing node in ring 600.

In some embodiments, processing node 610 detects the irregularity by sending an irregularity detection message on lane 1 of link 612. The irregularity detection message can include an indication as to which lane the message was sent from. When each processing node in ring 600 receives such an irregularity detection message, the processing node can compare the indicated lane with the actual lane that the message was received on. In the event the indicated lane and the actual lane are not the same, the processing node determines that the irregularity is between the particular processing node and the preceding processing node, and can thus identify itself as the first processing node in the ring. Thus, processing node 620 receives the irregularity detection message on lane 1 of link 624, and forwards the message on lane 1 of link 622. When processing node 610 receives the irregularity detection message on lane 2 of link 614, and the message indicates that the processing node 620 received the message on lane 1, processing node 610 identifies itself as the first processing node in ring 600. The skilled artisan will recognize that irregularities can be created between other combinations of lanes, and that irregularity detection messages can be sent on other lanes to detect the irregularities, as needed or desired. In some embodiments (not illustrated), each pair of processing nodes is provided with an irregularity on a different pair of lanes, and the absolute reference location is encoded based upon a binary encoding of the lane swapping. For example, a pair of straight lanes can encode a logic 0, and a pair of swapped lanes can encode a logic 1. Further, a ternary encoding can swap all combinations of groups of three lanes.

In other embodiments, processing node 610 detects the irregularity as a function of the link initialization between processing node 610 and processing node 620. For example, each lane of link 622 can identify itself when the communications between links 622 and 614 is established, and processing node 610 can determine that communications originating from a particular lane on processing node 620 are being received on a different lane of processing node 610, and can thereby determine that it is the first processing node in ring 600. The skilled artisan will recognize that this technique also can be applied to detect irregularities in other lanes, as needed or desired. It will be further recognized that ring 600 only shows one dimension, and that one or more dimensions can be added as needed or desired. In some embodiments, links 612, 614, 622, and 624 represent x4 PCIe links. As such, the skilled artisan will recognize that PCIe links are equipped to handle the irregularity, such that the data received on or sent from link 614 will be correctly handled in processing nodes 610 and 620. Note that, while illustrated as single connections, the skilled artisan will recognize that each connection may need to be formed by multiple discrete signal connections, depending upon the communications standard used to make up the links.

Figure 7:
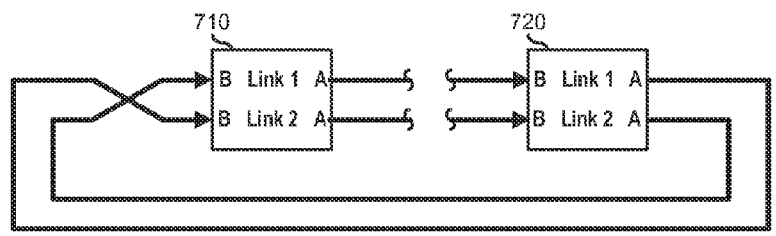
FIG. 7 is a block diagram illustrating another example port wiring of processing nodes of a ring in accordance with some embodiments.

FIG. 7 illustrates an example approach to implementing a multiple link-based port-type irregularity in the wiring of an interconnect connecting processing nodes in a folded torus ring in accordance with some embodiments. In the depicted example, a ring 700 including processing nodes 710 and 720, and one or more additional processing nodes (not shown). Processing nodes 710 and 720 are similar to processing nodes 610 and 620. Ring 700 operates similarly to ring 600. However, in the example of FIG. 7, processing nodes 710 and 720 are connected via multiple links, illustrated as link 1 and link 2 in the respective processing nodes. Here, rather than forming an irregularity using a lane of a link, the irregularity is formed at the link level. Otherwise, the operation of ring 700 is the same as the operation of ring 600.

Figure 8:
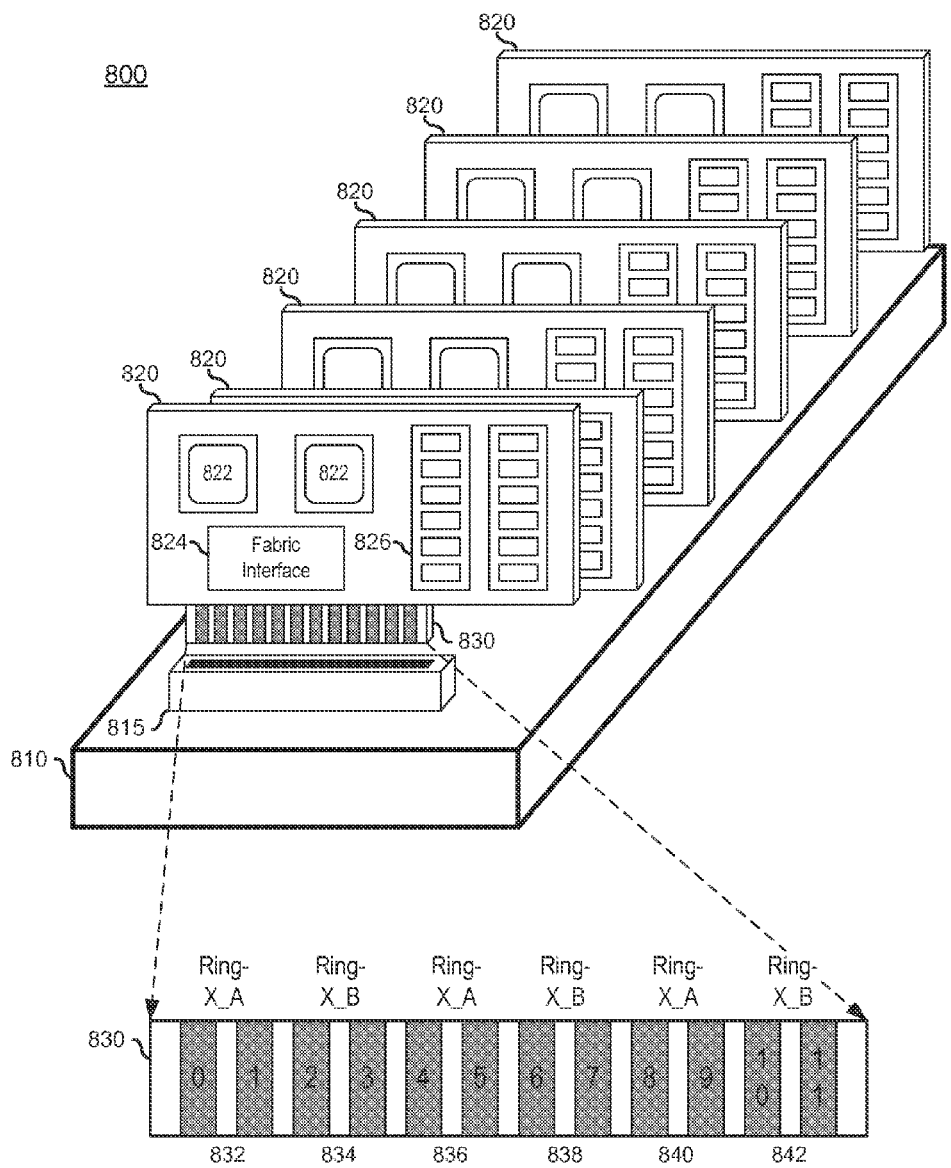
FIG. 8 is a diagram illustrating a computing system employing a plurality of field replaceable units (FRU) and an interconnect in accordance with some embodiments.

FIG. 8 illustrates a computing system 800 employing link irregularities to facilitate relative position determinations in a ring-type or torus-type network topology in accordance with some embodiments. The computing system 800 can comprise, for example, a server system (e.g., a server rack) or other high-performance computing system. Computing system 800 includes an interconnect 810 and one or more plug-in sockets 815. Each plug-in socket 815 operates to connect one or more field replaceable units (FRUs) 820 (one example of a processing node) into interconnect 810. FRU 820 represents a processing capacity of computing system 800, and can be operated as a stand-alone computer within the computing system 800, as a virtualizable resource of a virtual machine manager implemented on the computing system 800, or as a parallel computing capability associated with a high performance computing operating system, can be operated in another FRU, or a combination thereof. Interconnect 810 operates to connect FRUs 820 into rings and to connect the rings into a 2D- or 3D-torus network topology, where each ring implements one or two irregularities in the wiring of the links between corresponding plug-in sockets 815 as described above.

FRU 820 includes a processing component including one or more processor cores 822 connected to a fabric interface 824 (e.g., a southbridge or input/output controller) and one or more memory devices 826 (e.g., system random access memory (RAM)), whereby one or more memory devices 826 comprise a computer readable medium storing executable instructions that manipulate the one or more processor cores 822 to implement the functionality attributed herein to a processing node. FRU 820 further includes a socket interface 830 that operates to connect the FRU into interconnect 810 via plug-in socket 815. An example of interconnect 810 includes an XAUI interconnect, an InfiniBand interconnect, a PCIe interconnect, a Serial Attached SCSI (SAS) interconnect, or another interconnect, as needed or desired.

Interconnect 810 includes a fabric interconnect that provides data communication paths between the plug-in sockets 815, such that the fabric interconnect operates to configure the plug-in sockets 815 into a 2D- or 3D-torus network topology, such as network 100 of FIG. 1, and whereby FRUs 820 take advantage of these data communication paths through their corresponding fabric interface 824. As such, fabric interface 824 operates according to a particular protocol that is common to FRUs 820. Socket interface 830 provides electrical contacts (e.g., pins) that electrically connect to corresponding electrical contacts of plug-in socket 815 to act as port interfaces for an X-dimension ring (e.g., ring-X-A port 832 for pins 0 and 1 and ring-X-B port 834 for pins 2 and 3), for a Y-dimension ring (e.g., ring-Y_A port 836 for pins 4 and 5 and ring-Y_B port 838 for pins 6 and 7), and for an Z-dimension ring (e.g., ring-Z_A port 840 for pins 8 and 9 and ring-Z_B port 842 for pins 10 and 11). In the illustrated embodiment, each port 832 through 842 is a serial duplex single-ended transmitter comprising a transmit TX signal pin and a receive RX signal pin. The skilled artisan will understand that a port can include additional TX/RX signal pins to accommodate additional lanes or additional ports (e.g., for parallel transmission or for differential-signaling implementations), as needed or desired, and that the specification of a particular protocol may call for additional pins to be included on socket interface 830.

While the depicted example of socket interface 830 provides port interfaces for X-, Y-, and Z-dimension rings, interconnect 810 can include a fabric interconnect that utilizes one, two, or all three dimensions. For example, interconnect 810 can be designed with a fabric interconnect that utilizes only the X-dimension ring ports 832 and 834, such that computing system 800 is configured as one or more rings. Further, interconnect 810 can be designed with a fabric interconnect that utilizes the X- and Y-dimension ring ports 832, 834, 836, and 838, such that computing system 800 is configured in a 2D-torus network topology. Finally, interconnect 810 can be designed with a fabric interconnect that utilizes the X-, Y-, and Z-dimension ring ports 832, 834, 836, 838, 840, and 842, such that computing system 800 is configured in a 3D-torus network topology. The skilled artisan will understand that additional dimensions can be accommodated with the addition of extended dimension ports.

Figure 9:
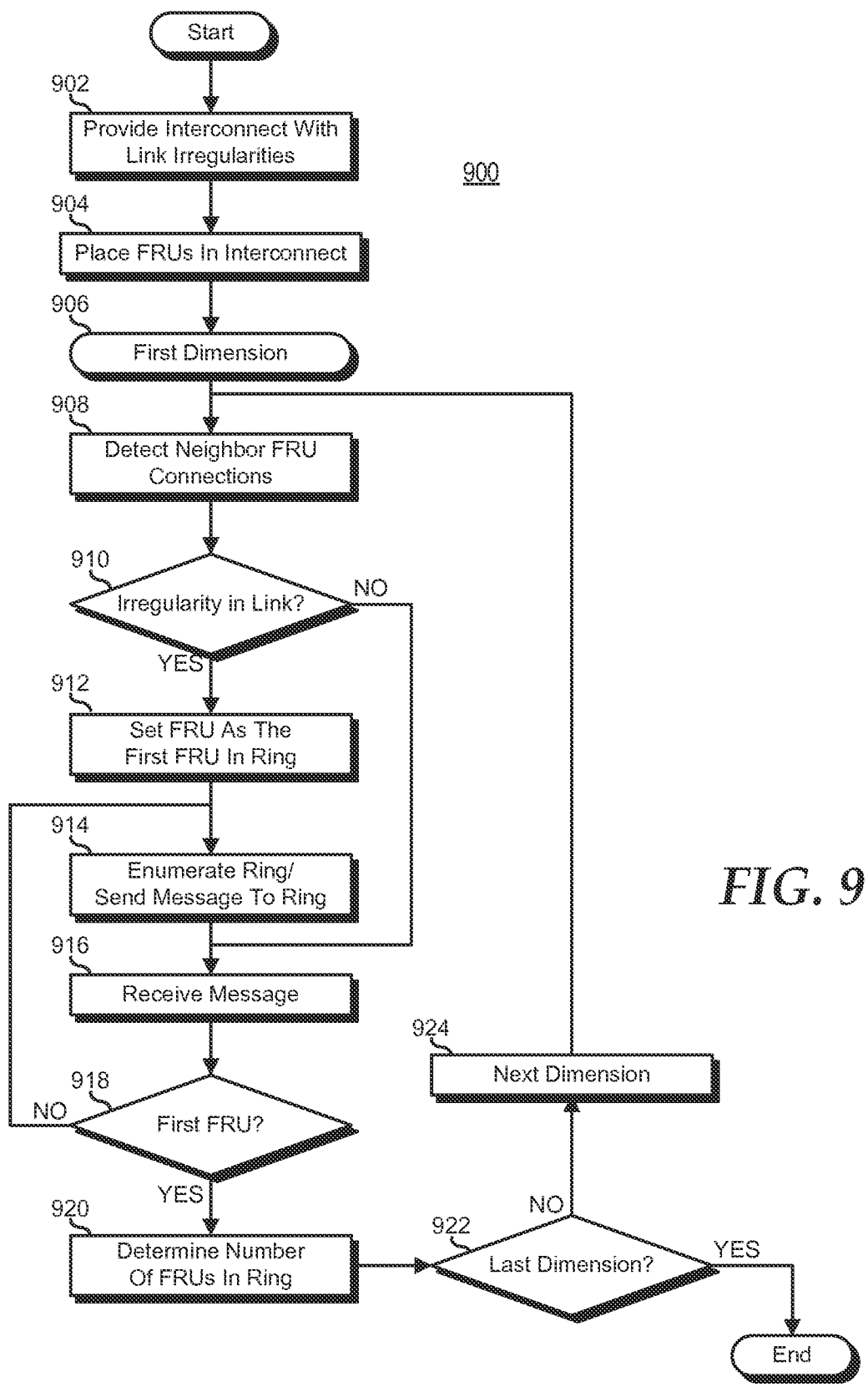
FIG. 9 is a flow diagram illustrating a method for position discovery through detection of inter-processing node link irregularities in a network topology in accordance with some embodiments.

FIG. 9 illustrates a method for position discovery for processing nodes in a network by detecting irregularities in a network topology in accordance with some embodiments. The method initiates at block 902, whereby an interconnect, such as interconnect 700 of FIG. 7, is implemented in a computing system, such as computing system 800 of FIG. 8, whereby a fabric interconnect of the interconnect implements links between sockets (such as plug-in sockets 815 of FIG. 8) associated with a ring of the network topology. In some embodiments, the interconnect can include a fabric interconnect that implements a 2D- or 3D-torus network topology, having rings in two or three dimensions, and each ring of in the interconnect can be provided with regular links and one or more irregular links so as to facilitate relative position determination.

FRUs (such as FRUs 820 of FIG. 8) are connected to the plug-in sockets the interconnect in block 904. For instance, processing nodes or blade systems can be installed into a server system that includes the interconnect. For example, FRUs 820 can be installed into interconnect 810 of computing system 800. An FRU selects a first dimension of the implemented topology at block 906. For example, an X-dimension can be selected for evaluation. At block 908, each FRU evaluates its port connections to determine if any of the ports are connected to an irregular link. In some embodiments, an irregular link is detected based on the port-types of the ports connected to the link. For example, an irregular link may be identified as a link connecting ports of the same port type. Thus, a link connecting a port of an FRU that is of a first type to a port of another FRU that is of the same type (e.g., A-to-A link or B-to-B link) would be considered an irregular link. In this example, a regular link would be identified as a link connecting ports of different port types (e.g., an A-to-B link). For example, an irregular link can include a link connecting a first lane of a PCIe link in a first FRU to a second lane of a second FRU. As another example, the irregular link can include a link connecting a first PCIe link in a first FRU to a second PCIe link in a second FRU. Conversely, a link connecting ports of the same type may be considered a regular link and a link connecting ports of different types may be considered an irregular link. As noted above, the port type of the port at each end of a link may be signaled by the exchange of port-type messages or other indicators during, for example, an auto-negotiation process by the ports over the link.

At block 912, each FRU determines whether it is proximate to an irregularity in the ring (that is, if it is connected to a link having a link characteristic defined as an irregularity for position location purposes). If the FRU is not connected to an irregular link, the "NO" branch of decision block 912 is taken, and the method continues in block 918, as described below. If a the FRU is connected to an irregular link, the "YES" branch of decision block 912 is taken, and the FRU that detects the irregularity is set as the first FRU in the ring in block 914. The first FRU enumerates the ring in block 916. For example, the first FRU can send a message to the FRUs in the ring that identifies the first processing node, and whereby the subsequent FRUs can be identified relative to the first FRU. Each FRU in a ring receives the enumeration message in block 918. In some embodiments, each FRU determines a position in the interconnect based upon the message.

Each FRU determines whether or not the FRU that has received the enumeration message is the first FRU in decision block 920. If not, the "NO" branch of decision block 920 is taken and the method returns to block 916 where the message is forwarded to the next FRU. If the FRU that has received the enumeration message is the first FRU, the "YES" branch of decision block 920 is taken, and the first FRU determines the number of FRUs in the ring, based upon the received message. A determination is made as to whether or not the evaluated dimension is the last dimension in decision block 924. If so, the "YES" branch of decision block 924 is taken and the method ends. If the evaluated dimension is not the last dimension, the "NO" branch of decision block 924 is taken, a next dimension is selected for evaluation in block 926, and the method returns to block 910 where the connections between each FRU in another ring and the neighbors of the FRU are detected to determine if any of the connections include an irregularity.

In some embodiments, the techniques described above may at least partially implemented by one or more processors of a processing system executing software. The software comprises one or more sets of executable instructions that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

In some embodiments, the integrated circuits described above are implemented as one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 10:
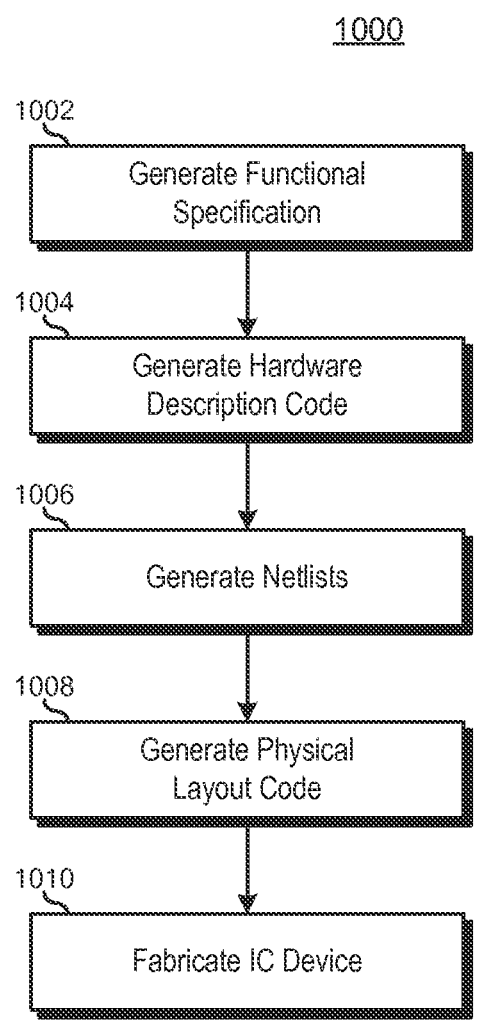
FIG. 10 is a flow diagram illustrating a method for designing and fabricating an integrated circuit device implementing at least a portion of a processing node in accordance with some embodiments.

FIG. 10 is a flow diagram illustrating an example method 1000 for the design and fabrication of an IC device implementing one or more aspects disclosed herein. For example, the IC device could comprise an IC device of FRU or other processing node. As noted above, the code generated for each of the following processes is stored or otherwise embodied in computer readable storage media for access and use by the corresponding design tool or fabrication tool.

At block 1002 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1004, the functional specification is used to generate hardware description code representative of the hardware of the IC device. In at least one embodiment, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1006 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1008, one or more EDA tools use the netlists produced at block 1006 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1010, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In the embodiments described herein, a system can include an instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, a system can include a personal computer, a consumer electronic device, a network server or storage device, a switch router, wireless router, or other network communication device, a network connected device, or any other suitable device. The system can include volatile or nonvolatile memory and one or more processing resources, such as a central processing unit (CPU). Additional components of the system can include storage devices, communications ports for communicating with external devices, input and output devices. The system can also include one or more buses operable to transmit communications between the various hardware components. Portions of a system may themselves be considered as a system.

In accordance with at least one aspect, a method in a network or processing nodes comprises at a first processing node of a first ring of processing nodes comprising the first processing node, a second processing node, and a third processing node, determining a relative position of the first processing node in the first ring responsive to determining that a first link between the first processing node and the second processing node has a link characteristic different than a link characteristic of a second link between the first processing node and the third processing node. In some embodiments, the link characteristic of the first link comprises a connection of a port of a first type of the first processing node to a port of the first type of the second processing node, and the link characteristic of the second link comprises a connection of a port of a second type of the first processing node to a port of the first type of the third processing node. Further, a port of the first type comprises a port that signals a first port-type indicator and a port of the second type comprises a port that signals a second port-type indicator. Alternatively, the first link and second link comprise Peripheral Component Interconnect Express (PCIe) links, the first type comprises a first lane of a PCIe link, and the second type comprises a second PCIe lane of the PCIe link. In one aspect, the first link comprises a first differential signaling link and the link characteristic of the first link comprises a first polarity of the first differential signaling link, and the second link comprises a second differential signaling link and the link characteristic of the second link comprises a second polarity of the second differential signaling link that is opposite the first polarity.

In one aspect, the method further includes transmitting a first message from the first processing node to the second processing node, the first message representing the relative position of the first processing node in the first ring. The method further comprises determining, at the second processing node, a relative position of the second processing node in the first ring responsive to the first message and transmitting a second message from the second processing node to another processing node of the first ring, the second message representing the relative position of the second processing node in the first ring. In one aspect, a second ring of the network includes the first processing node and a fourth processing node, and the method further comprises receiving, at the first processing node, a second message from the fourth processing node via a third port of the first processing node, the second message representing a relative position of the fourth processing node in the second ring, and determining, at the first processing node, a relative position of the first processing node in the second ring responsive to the second message. In one aspect, an interconnect coupling the network of processing nodes does not include pins dedicated to position identification in the interconnect. In one aspect, the first, second, and third processing nodes each comprises a field replaceable unit that is coupled to a corresponding socket of an interconnect, and the method further comprises determining a location of the socket coupled to the first processing node based on the relative position of the first processing node.

In accordance with another aspect, a field replaceable unit (FRU) comprises a socket interface coupleable to a corresponding socket of an interconnect of a server, the socket interface comprising a plurality of electrical contacts to electrically couple with corresponding electrical contacts of the corresponding socket. The FRU further comprises a processing component comprising a first port coupled to a first subset of the plurality of electrical contacts, and a second port coupled to a second subset of the plurality of electrical contacts, wherein the processing component is to determine a relative position of the FRU in a first ring of the interconnect responsive to determining the first port is coupled to a first link of the interconnect that has a first link characteristic and the second port is coupled to a second link of the interconnect that has a second link characteristic different than the first link characteristic.

In one aspect, the first link characteristic of the first link comprises the first link connecting the first port to a port of another FRU with a same port type as the first port, and the second link characteristic of the second link comprises the second link connecting the second port to a port of another FRU with a different port type than the second port. In one aspect, the first link comprises a first differential signaling link and the first link characteristic of comprises a first polarity of the first differential signaling link, and the second link comprises a second differential signaling link and the second link characteristic a second polarity of the second differential signaling link that is opposite the first polarity. In one aspect, the processing component is to transmit a first message to another FRU in the first ring via one of the first port and the second port, the first message representing the relative position of the FRU in the first ring. The processing component further may comprise a third port coupled to a third subset of the plurality of electrical contacts, and a fourth port coupled to a fourth subset of the plurality of electrical contacts, and the processing component is further to determine a relative position of the FRU in a second ring of the interconnect responsive to determining the third port is coupled to a third link of the interconnect that has a third link characteristic and the fourth port is coupled to a fourth link of the interconnect that has a fourth link characteristic different than the third link characteristic. In one aspect, the processing component is further operable to transmit a message to another FRU in the second ring via one of the third port and the fourth port, the message representing the relative position of the FRU in the second ring.

In yet another aspect, a computing system comprises a set of processing nodes coupled in a network topology via an interconnect, the network topology comprising a first ring of processing nodes. The first ring comprises a subset of the set of processing nodes, each processing node of the subset having a first port coupled to a port of another processing node in the first ring via a corresponding link have a first link characteristic and having a second port of coupled to a port of another processing node in the first ring via a corresponding link having the first link characteristic, and a first processing node of the set of processing nodes, the first processing node having a first port coupled to a port of a second processing node in the first ring via a link having the first link characteristic and having a second port coupled to a port of a third processing node of the first ring via a link having a second link characteristic different than the first link characteristic. Each processing node in the first ring has a corresponding position in the first ring that is relative to the first processing node. In one aspect, the network topology comprises a torus network having a plurality of rings, the plurality of rings including the first ring and a second ring, the second ring including the first processing node, and the first processing node has a third port coupled to a port of a fourth processing node in the second ring via a link having the first link characteristic and a fourth port coupled to a port of a fifth processing node in the second ring via a link having the second link characteristic. Each processing node in the second ring has a corresponding position in the second ring that is relative to the first processing node.

In one aspect, the first processing node is to transmit a first message to one of the second processing node and the third processing node, the first message representing the relative position of the first processing node in the first ring, and transmit a second message to one of the third processing node and the fourth processing node, the second message representing the relative position of the first processing node in the second ring. In one aspect, the first processing node is to transmit a first message to the second processing node, the first message representing the relative position of the first processing node in the first ring. The second processing node is to determine a relative position of the second processing node in the first ring responsive to the first message, and transmit a second message to another processing node of the first ring, the second message representing the relative position of the second processing node in the first ring.

In one aspect, the first link characteristic comprises a link connecting ports of different port types, and the second link characteristic comprises a link connecting ports of a same port type. In one aspect, the first link comprises a first differential signaling link and the first link characteristic of comprises a first polarity of the first differential signaling link, and the second link comprises a second differential signaling link and the second link characteristic a second polarity of the second differential signaling link that is opposite the first polarity.

In one aspect, the interconnect comprises a plurality of sockets wired in a torus network topology, the plurality of sockets comprising a subset of sockets, each socket of the subset having electrical contacts wired to provide links having the first link characteristic, and a select socket having electrical contacts wired to provide a link having the first link characteristic and electrical contacts wired to provide a link having the second link characteristic. Each processing node of the subset is coupled to a corresponding socket of the subset of sockets, and the first processing node is coupled to the select socket.

In accordance with yet another aspect, a non-transitory computer readable medium stores code operable to adapt a first processing node to perform a method. The method comprises, in a first ring of processing nodes comprising the first processing node, a second processing node, and a third processing node, determining a relative position of the first processing node in the first ring responsive to determining that a first link between the first processing node and the second processing node has a link characteristic different than a link characteristic of a second link between the first processing node and the third processing node. In one aspect, the link characteristic of the first link comprises a connection of a port of a first type of the first processing node to a port of the first type of the second processing node, and the link characteristic of the second link comprises a connection of a port of a second type of the first processing node to a port of the first type of the third processing node. In one aspect, a port of the first type comprises a port that signals a first port-type indicator and a port of the second type comprises a port that signals a second port-type indicator. In one aspect, the method further includes transmitting a first message from the first processing node to the second processing node, the first message representing the relative position of the first processing node in the first ring.

In accordance with another aspect, an interconnect implements a torus network topology. The interconnect comprises a first plurality of sockets wired in a first ring, the first plurality of sockets comprising a first subset of sockets, each socket of the first subset having electrical contacts wired to provide links having a first link characteristic for the first ring, and a first socket having electrical contacts wired to provide a link having the first link characteristic for the first ring and having electrical contacts wired to provide a link having a second link characteristic for the first ring. In one aspect, the interconnect further comprises a second plurality of sockets wired in a second ring. The second plurality of sockets comprises a second subset of sockets, each socket of the first subset having electrical contacts wired to provide links having the first link characteristic for the second ring, and the first socket further having electrical contacts wired to provide a link having the first link characteristic for the second ring and having electrical contacts wired to provide a link having the second link characteristic for the first ring.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the disclosed embodiments as set forth in the claims below. Accordingly, the specification and figures are to be regarded in an illustrative rather than a restrictive sense, and all such modifications are intended to be included within the scope of the disclosed embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a network of processing nodes, a method comprising:
at a first processing node of a first ring of processing nodes comprising the first processing node, a second processing node, and a third processing node, determining the first processing node is at an absolute position in the first ring responsive to determining that a first link between the first processing node and the second processing node has a link characteristic different than a link characteristic of a second link between the first processing node and the third processing node.

2. The method of claim 1, wherein:
the link characteristic of the first link comprises a connection of a port of a first type of the first processing node to a port of the first type of the second processing node; and the link characteristic of the second link comprises a connection of a port of a second
type of the first processing node to a port of the first type of the third processing node.

3. The method of claim 2, wherein a port of the first type comprises a port that signals a first port-type indicator and a port of the second type comprises a port that signals a second port-type indicator.

4. The method of claim 2, wherein:
the first link and second link comprise Peripheral Component Interconnect Express (PCIe) links;
the first type comprises a first PCIe lane of a PCIe link; and
the second type comprises a second PCIe lane of the PCIe link.

5. The method of claim 1, wherein:
the first link comprises a first differential signaling link and the link characteristic of the first link comprises a first polarity of the first differential signaling link; and
the second link comprises a second differential signaling link and the link characteristic of the second link comprises a second polarity of the second differential signaling link that is opposite the first polarity.

6. The method of claim 1, further comprising:
transmitting a first message from the first processing node to the second processing node, the first message representing the absolute position of the first processing node in the first ring.

7. The method of claim 6, further comprising:
determining, at the second processing node, a position of the second processing node in the first ring relative to the absolute position responsive to the first message; and
transmitting a second message from the second processing node to another processing node of the first ring, the second message representing the position of the second processing node in the first ring.

8. The method of claim 1, wherein:
a second ring of the network includes the first processing node and a fourth processing node; and
the method further comprises:
  receiving, at the first processing node, a second message from the fourth processing node via a third port of the first processing node, the second message representing a position of the fourth processing node in the second ring relative to an absolute position in the second ring; and
  determining, at the first processing node, a position of the first processing node in the second ring relative to the absolute position in the second ring responsive to the second message.

9. The method of claim 1, wherein an interconnect coupling the network of processing nodes does not include pins dedicated to position identification in the interconnect.

10. The method of claim 1, wherein:
the first, second, and third processing nodes each comprises a field replaceable unit that is coupled to a corresponding socket of an interconnect; and
the method further comprises determining a location of the socket coupled to the first processing node based on the position of the first processing node.

11. A field replaceable unit (FRU) comprising:
a socket interface coupleable to a corresponding socket of an interconnect of a server, the socket interface comprising a plurality of electrical contacts to electrically couple with corresponding electrical contacts of the corresponding socket; and
a processing component comprising a first port coupled to a first subset of the plurality of electrical contacts, and a second port coupled to a second subset of the plurality of electrical contacts, wherein the processing component is to determine the FRU is at an absolute position in a first ring of the interconnect responsive to determining the first port is coupled to a first link of the interconnect that has a first link characteristic and the second port is coupled to a second link of the interconnect that has a second link characteristic different than the first link characteristic.

12. The FRU of claim 11, wherein:
the first link characteristic of the first link comprises the first link connecting the first port to a port of another FRU with a same port type as the first port; and
the second link characteristic of the second link comprises the second link connecting the second port to a port of another FRU with a different port type than the second port.

13. The FRU of claim 11, wherein:
the first link comprises a first differential signaling link and the first link characteristic of comprises a first polarity of the first differential signaling link; and
the second link comprises a second differential signaling link and the second link characteristic comprises a second polarity of the second differential signaling link that is opposite the first polarity.

14. The FRU of claim 11, wherein the processing component is to transmit a first message to another FRU in the first ring via one of the first port and the second port, the first message representing the position of the FRU in the first ring.

15. The FRU of claim 11, wherein:
the processing component further comprises a third port coupled to a third subset of the plurality of electrical contacts, and a fourth port coupled to a fourth subset of the plurality of electrical contacts; and
the processing component is further to determine a position of the FRU in a second ring of the interconnect relative to an absolute position in the second ring responsive to determining the third port is coupled to a third link of the interconnect that has a third link characteristic and the fourth port is coupled to a fourth link of the interconnect that has a fourth link characteristic different than the third link characteristic.

16. The FRU of claim 15, wherein:
the processing component is further operable to transmit a message to another FRU in the second ring via one of the third port and the fourth port, the message representing the position of the FRU in the second ring.

17. A computing system comprising:
a set of processing nodes coupled in a network topology via an interconnect, the network topology comprising a first ring of processing nodes, the first ring comprising:
  a subset of the set of processing nodes, each processing node of the subset having a first port coupled to a port of another processing node in the first ring via a corresponding link having a first link characteristic and having a second port of coupled to a port of another processing node in the first ring via a corresponding link having the first link characteristic; and
  a first processing node of the set of processing nodes, the first processing node having a first port coupled to a port of a second processing node in the first ring via a link having the first link characteristic and having a second port coupled to a port of a third processing node of the first ring via a link having a second link characteristic different than the first link characteristic;
  wherein each processing node in the first ring has a corresponding position in the first ring that is relative to the first processing node;
  wherein the first processing node is to transmit a first message to the second processing node, the first message representing the position of the first processing node in the first ring;
  wherein the network topology comprises a torus network having a plurality of rings, the plurality of rings including the first ring and a second ring, the second ring including, the first processing node;
  wherein the first processing node has a third port coupled to a port of a fourth processing node in the second ring is a link having the first link characteristic and a fourth port coupled to a port of a fifth processing node in the second ring via a link having the second link characteristic; and
  wherein each processing node in the second ring has a corresponding position in the second ring that is relative to the first processing node.

18. The computing system of claim 17, wherein the first processing node is to:
transmit a second message to one of the third processing node and the fourth processing node, the second message representing the position of the first processing node in the second ring.

19. The computing system of claim 17, wherein the second processing node is to:
- determine a position of the second processing node in the first ring relative to the position of the first node responsive to the first message; and
- transmit a second message to another processing node of the first ring, the second message representing the position of the second processing node in the first ring.

20. The computing system of claim 17, wherein:
- the first link characteristic comprises a link connecting ports of different port types; and
- the second link characteristic comprises a link connecting ports of a same port type.

21. The computing system of claim 17, wherein:
- the first link comprises a first differential signaling link and the first link characteristic of comprises a first polarity of the first differential signaling link; and
- the second link comprises a second differential signaling link and the second link characteristic a second polarity of the second differential signaling link that is opposite the first polarity.

22. A computing system comprising:
- a set of processing nodes coupled in a network topology via an interconnect, the network topology comprising a first ring of processing nodes, the first ring comprising:
  - a subset of the set of processing nodes, each processing node of the subset having a first port coupled to a port of another processing node in the first ring via a corresponding link having a first link characteristic and having a second port, of coupled to a port of another processing node in the first ring via a corresponding link having the first link characteristic; and
  - a first processing node of the set of processing nodes, the first processing node having a first port coupled to a port of a second processing node in the first ring via a link having the first link characteristic and having a second port coupled to a port of a third processing node of the first ring via a link having a second link characteristic different than the first characteristic;
  - wherein each processing node in the first ring has a corresponding position in the first ring that is relative to the first processing node;
  - wherein the first processing node is to transmit a first message to the second processing node the first message representing the position of the first processing node in the first ring and
- wherein the interconnect comprises a plurality of sockets wired in a torus network topology, the plurality of sockets comprising:
  - a subset of sockets, each socket of the subset having electrical contacts wired to provide links having the first link characteristic; and
  - a select socket having electrical contacts wired to provide a link having the first link characteristic and electrical contacts wired to provide a link having the second link characteristic;
  - each processing node of the subset is coupled to a corresponding socket of the subset of sockets; and
  - the first processing node is coupled to the select socket.

23. The computing system of claim 22, wherein:
- the first link characteristic comprises a link connecting ports of different port types; and
- the second link characteristic comprises a link connecting ports of a same port type.

24. The computing system of claim 22, wherein:
- the first link comprises a first differential signaling link and the first link characteristic of comprises a first polarity of the first differential signaling link; and
- the second link comprises a second differential signaling link and the second link characteristic a second polarity of the second differential signaling link that is opposite the first polarity.

25. An interconnect implementing a torus network topology, the interconnect comprising:
- a first plurality of sockets wired in a first ring, the first plurality of sockets comprising:
  - a first subset of sockets, each socket of the first subset having electrical contacts wired to provide links having a first link characteristic for the first ring; and
  - a first socket having electrical contacts wired to provide a link having the first link characteristic for the first ring and having electrical contacts wired to provide a link having a second link characteristic for the first ring.

26. The interconnect of claim 25, further comprising:
- a second plurality of sockets wired in a second ring, the second plurality of sockets comprising:
  - a second subset of sockets, each socket of the first subset having electrical contacts wired to provide links having the first link characteristic for the second ring; and
  - the first socket further having electrical contacts wired to provide a link having the first link characteristic for the second ring and having electrical contacts wired to provide a link having the second link characteristic for the first ring.

* * * * *